US012413666B2

(12) United States Patent
Edwards et al.

(10) Patent No.: US 12,413,666 B2
(45) Date of Patent: Sep. 9, 2025

(54) COMPUTER-BASED SYSTEMS CONFIGURED TO GENERATE AN INTERACTIVE COMMUNICATION FOR A PLURALITY OF THE REPETITIVE INTERACTION SESSIONS AND METHODS OF USE THEREOF

(71) Applicant: Capital One Services, LLC, McLean, VA (US)

(72) Inventors: Joshua Edwards, Philadelphia, PA (US); Shabnam Kousha, Washington, DC (US); Asher Smith-Rose, Midlothian, VA (US); Tyler Maiman, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 222 days.

(21) Appl. No.: 18/452,226

(22) Filed: Aug. 18, 2023

(65) Prior Publication Data
US 2025/0063116 A1 Feb. 20, 2025

(51) Int. Cl.
*H04M 3/00* (2024.01)
*H04L 65/1076* (2022.01)
*H04L 65/1101* (2022.01)
*H04M 3/22* (2006.01)
*H04M 3/51* (2006.01)

(52) U.S. Cl.
CPC ...... *H04M 3/2281* (2013.01); *H04L 65/1079* (2013.01); *H04L 65/1101* (2022.05); *H04M 3/5191* (2013.01); *H04M 2201/42* (2013.01); *H04M 2203/6027* (2013.01)

(58) Field of Classification Search
CPC ............ H04M 3/2281; H04M 3/5191; H04M 2201/42; H04M 2203/6027; H04L 65/1101; H04L 65/1079
USPC ....... 379/265.01–265.14, 266.01–266.1, 309
See application file for complete search history.

(56) References Cited

U.S. PATENT DOCUMENTS

| 9,185,175 | B1 | 11/2015 | Sharma et al. |
| 9,871,813 | B2 | 1/2018 | Andreeva et al. |
| 10,616,411 | B1* | 4/2020 | Chang ............... H04M 3/2281 |
| 10,721,350 | B1* | 7/2020 | Maiorana ............ G10L 15/22 |
| 11,367,080 | B2* | 6/2022 | Konig ................ G06Q 30/02 |
| 11,618,205 | B2* | 4/2023 | Bartoli ................ B29C 51/04 |
| | | | 264/241 |

(Continued)

*Primary Examiner* — William J Deane, Jr.
(74) *Attorney, Agent, or Firm* — Greenberg Traurig, LLP

(57) ABSTRACT

In some embodiments, the present disclosure provides an exemplary method that may include steps of obtaining, a permission from each user to monitor a plurality of activities; continually receiving monitoring data of the plurality of activities; identifying a plurality of related incoming interaction sessions within the predetermined period of time; automatically verifying at least one common session parameter; utilizing a machine learning algorithm to determine at least one transaction; determining a plurality of fraudulent transactional rules; automatically adjusting the plurality of fraudulent transactional rules; utilizing a natural language processing algorithm to automatically generate at least one interaction notification; receiving a response to the interactive notification; and automatically updating the database of known session interaction parameters based on the response to the interactive notification.

20 Claims, 7 Drawing Sheets

(56) References Cited

U.S. PATENT DOCUMENTS

| | | | |
|---|---|---|---|
| 12,149,558 B1* | 11/2024 | Brown | H04L 63/1433 |
| 2003/0174823 A1* | 9/2003 | Justice | G06Q 20/4016 |
| | | | 379/145 |
| 2016/0142143 A1* | 5/2016 | Zhou | H04B 10/272 |
| | | | 398/58 |
| 2023/0141773 A1* | 5/2023 | Ramadhane | H04L 9/3236 |
| | | | 455/410 |
| 2023/0164198 A1* | 5/2023 | Bhattacharjee | H04L 65/1104 |
| | | | 370/271 |
| 2023/0273981 A1* | 8/2023 | Rapowitz | G06F 21/31 |
| | | | 726/4 |

* cited by examiner

300 —

302 — Speaker 1: Hello, this is John Smith. I hold three accounts with your financial institution. A loan account, a credit card account, and a bank account. Can you help me to get me some information on these accounts?

304 — Speaker 2: How can I help you, Mister Smith?

Speaker 1: My computer crashed, and I cannot get into my account. First, can you help me with my loan account?

Speaker 2: Sure. What is your loan account number or social security number?

Speaker 1: 45-A56126

Speaker 2: OK for security, what is the value of your loan?

Speaker 1: One hundred thousand, five hundred and thirty-one dollars.

Speaker 2: Thanks. How can I help you?

Speaker 1: In that my computer crashed, can you please tell me the value of this month's loan payment and due date as well as what means in the absence of account access that I transfer money to pay the loan?

Speaker 2: Can you tell me the bank account you have set up in your profile?

Speaker 1: Yes, XYZ Banker's Trust.

Speaker 2: Your current loan payment is $1657. Would you like me to authorize an ACH transfer to pay the loan payment?

Speaker 1: Yes, please.

Speaker 2: OK, the transfer request has been completed. How else can I help you?

Speaker 1: Does XYZ Banker's Trust have a mobile device app?

Speaker 2: Yes, we do? What kind of mobile device do you have - an Apple or Android?

Speaker 1: An Android device.

Speaker 2: Would you like instructions how to download the app?

Speaker 1: Yes

Speaker 2: Please go to the App Store for your android device and download the XYZ Banker's Trust. This will give you access to your accounts from your mobile device.

Speaker 1: Thanks so much for your help.

FIG. 3

COMPUTER-BASED SYSTEMS CONFIGURED TO GENERATE AN INTERACTIVE COMMUNICATION FOR A PLURALITY OF THE REPETITIVE INTERACTION SESSIONS AND METHODS OF USE THEREOF

FIELD OF TECHNOLOGY

The present disclosure generally relates to computer-based systems configured to dynamically generate authentication steps and perform an ameliorative action and methods of use thereof.

BACKGROUND OF TECHNOLOGY

Typically, spam is directed to large numbers of users for the purposes of advertising, phishing, or spreading malware. Usually, spam includes all forms of unwanted communications including, but not limited to unsolicited calls or messages, caller identification spoofing, and robocalls. The goal or purpose of a spam call is to sell some goods that might be unsolicited or unwanted.

SUMMARY OF DESCRIBED SUBJECT MATTER

In some embodiments, the present disclosure provides an exemplary technically improved computer-based method that includes at least the following steps: obtaining, by at least one processor, via each respective instance of at least one graphical user interface (GUI) having at least one programmable GUI element, a permission from each user in the plurality of users to monitor a plurality of activities executed within of a plurality of computing devices associated with the plurality of users; continually receiving, by the at least one processor, in response to obtaining the permission from the plurality of users, monitoring data of the plurality of activities executed within the plurality of computing devices for a predetermined period of time; identifying, by the at least one processor, based on the monitoring data, a plurality of related incoming interaction sessions being initiated, within the predetermined period of time, across the plurality of computing devices associated with the plurality of users; automatically verifying, by the at least one processor of the plurality of computing devices, at least one common session parameter associated with the plurality of related incoming interaction sessions to identify the plurality of related incoming interaction sessions as being a plurality of repetitive interaction sessions when, based on a database of known session interaction parameters, the at least one common session parameter is associated with at least one of a particular entity, a particular individual, or a particular physical location; utilizing, by the at least one processor of the plurality of computing devices, a machine learning algorithm to determine at least one transaction associated with at least one computing device of the plurality of computing devices associated with the plurality of users based on the at least one common session parameter of the plurality of related incoming interaction sessions; determining, by the at least one processor, a plurality of fraudulent transactional rules associated with the at least one transaction and the at least one computing device of the plurality of the computing devices associated with the plurality of users based on a pre-generated database of transactional rules; automatically adjusting, by the at least one processor, the plurality of fraudulent transactional rules associated with the at least one transaction based on a determination that the at least one transaction occurred during at least one repetitive interaction session of the plurality of the repetitive interaction sessions; utilizing, by the at least one processor, a natural language processing algorithm to automatically generate at least one interaction notification for transmission to the particular computing device of the plurality of computing devices; receiving, by the at least one processor, from the particular computing device, a response to the interactive communication; and automatically updating, by the at least one processor, the database of known session interaction parameters based on the response to the interactive communication.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 3 depicts an exemplary interactive communication generated by a utilization of a repetitive detection unit of a computing device, in accordance with one or more embodiments of the present disclosure.

DETAILED DESCRIPTION

Figure 1:
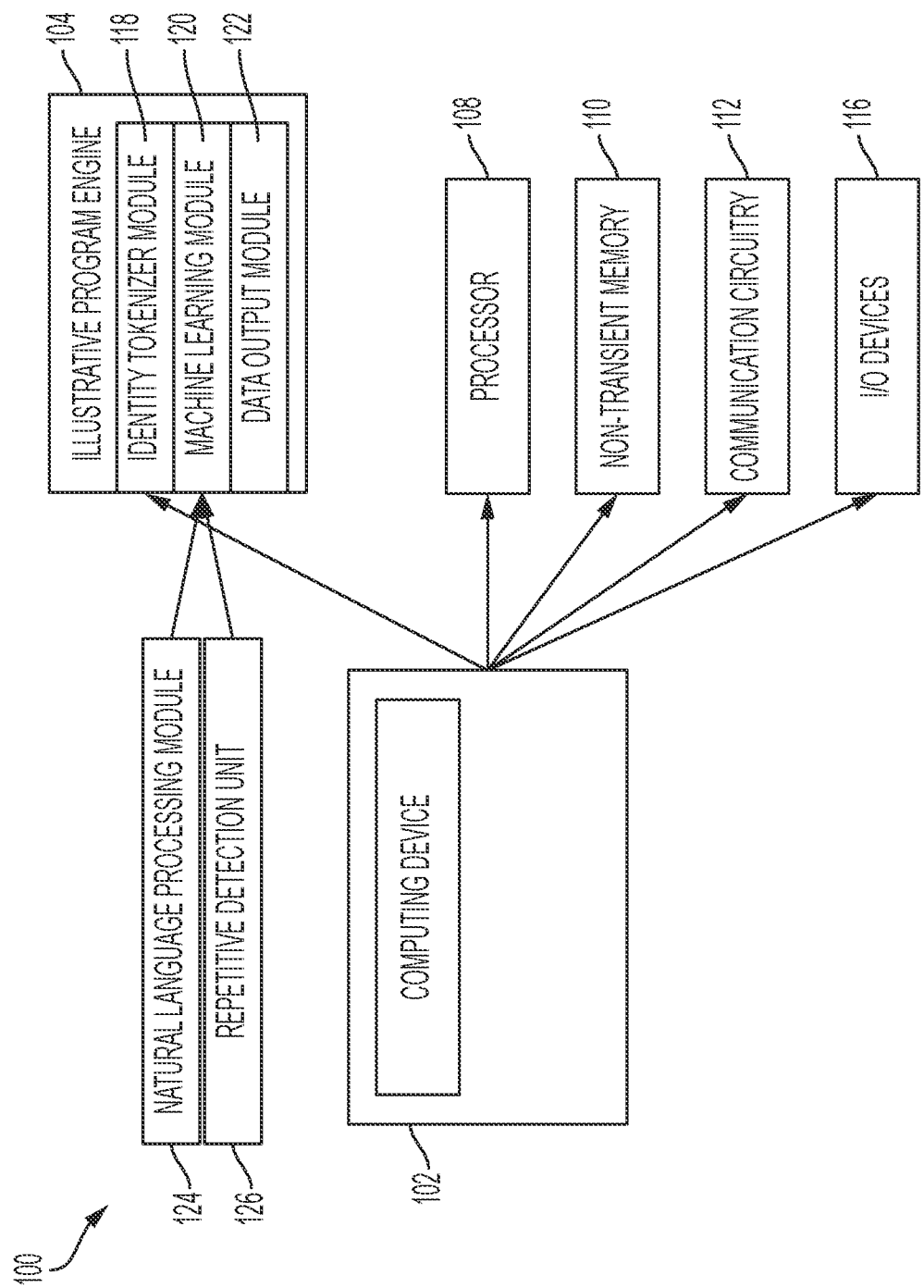
FIG. 1 depicts a block diagram of an exemplary computer-based system and platform for automatically adjusting a plurality of fraudulent transaction rules associated with at least one transaction, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a creator interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of a software application.

Embodiments of the present disclosure recognize at least one technological computer-centered problem associated with completing a transaction during an interaction session, which may invite potential security risks associated with attempting to complete a transaction with an entity during an interaction session, such as extraction of sensitive information associated with the individual, overdraft of an account due to error, and/or potential theft of funds within the account associated with the individual. The illustrative technological computer-centered problem may also arise during an interaction session between an individual and a computing device associated with an entity where a transaction occurs that meets or exceeds a threshold of funds being transferred due to lack of verification and authentication of the transaction that occurs during the interaction session and/or the interaction session occurs with a known suspicious entity. The illustrative technological computer-centered problem increases potential security risks associated with the customer experience associated with the computing device of the individual due to a fraudulent transaction and/or fraudulent interaction session based on a lack of visual, in-person verification due to the interaction session being remote. As detailed in at least some embodiments herein, at least one technological computer-centered solution associated with the illustrative technological computer-centered problem may be a utilization of a machine learning algorithm to determine that at least one transaction associated with at least one computing device associated with the individual based on a common session parameter; determine a plurality of fraudulent transactional rules associated with the at least one transaction based on a pre-generated database of transactional rules; and automatically adjusting the plurality of transactional rules based on the determination that the transaction occurred during a repetitive interaction session to increase security associated with transactions during the interaction session. In some embodiments, the present disclosure may utilize a natural language processing algorithm to automatically generate at least one interaction notification for transmission to a particular computing device, where the interaction notification may refer to a detailed communication script associated with the repetitive interaction session. In some embodiments, the present disclosure may obtain a permission from each user to monitor a plurality of activities within the computing device. In some embodiments, the present disclosure may continually receive monitoring data of the plurality of activities for a predetermined period of time. In some embodiments, the present disclosure may identify a plurality of related incoming interaction sessions being initiated within the predetermined period of time by the computing device associated with the user. In some embodiments, the present disclosure may automatically verify a common session parameter associated with the incoming interaction session to identify the incoming interactive session as a repetitive interaction session. In some embodiments, the at least one technological computer-centered solution associated with the illustrative technological computer-centered problem may be a utilization of a machine learning algorithm to determine that at least one transaction associated with at least one computing device associated with the individual based on a common session parameter. In some embodiments, the illustrative trained machine learning module may refer to the trained machine learning algorithm trained using an unsupervised learning and/or a semi-supervised learning for the predetermined period of time. For example, the machine learning module may include at least one of regression algorithm, instance-based algorithm, regularization algorithm, decision tree algorithm, Bayesian algorithm, clustering algorithm, associated rule learning algorithm, deep learning algorithm, dimensionality reduction algorithm, ensemble algorithm, and/or artificial neural network algorithm.

FIG. 1 depicts a block diagram of an exemplary computer-based system and platform for automatically adjusting a plurality of fraudulent transaction rules associated with at least one transaction, in accordance with one or more embodiments of the present disclosure.

In some embodiments, an illustrative computing system 100 of the present disclosure may include a computing device 102 associated with at least one user and an illustrative program engine 104. In some embodiments, the illustrative program engine 104 may be stored on the computing device 102. In some embodiments, the illustrative program engine 104 may be stored on the computing device 102, which may include a processor 108, a non-transient memory 110, a communication circuitry 112 for communicating over a communication network (not shown), and input and/or output (I/O) devices 116 such as a keyboard, mouse, a touchscreen, and/or a display, for example. In some embodiments, the computing device 102 may refer to at least one calling-enabled computing device of a plurality of calling-enabled computing devices. For example, the computing device 102 is a mobile device, a smart phone, and/or a laptop. In some instances, the computing device 102 may be the at least one calling-enabled computing device with an ability to execute a plurality of activities. In some instances, at least one activity of the plurality of activities may refer to an ability to initiate an interaction session with an external computing device. In some embodiments, the at least one activity of the plurality of activities may operate discreetly during the execution of at least one other activity of the plurality of activities. For example, the at least one activity operates in the background of the computing device 102. In some embodiments, the server computing device 106 may refer to a call center server system associated with a particular entity capable of processing a plurality of transactions during an interaction session.

In some embodiments, the illustrative program engine 104 may be configured to instruct the processor 108 to execute one or more software modules such as, without limitation, an exemplary automatic rules adjustment module 118, a machine-learning module 120, and/or a data output module 122.

In some embodiments, an exemplary automatic rules adjustment module 118 of the present disclosure, utilizes a least one machine learning algorithm, described herein, to automatically adjust a plurality of fraudulent transactional rules associated with the at least one transaction based on a determination that the at least one transaction occurred during at least one repetitive interaction session of the plurality of the repetitive interaction sessions and utilize a natural language processing module 124 to automatically generate an interaction notification for transmission to the computing device 102. For example, the natural language processing module 124 may be utilized to generate an interactive dialogue script in response to an automatic adjustment of fraudulent transactions rules based on a determination that a transaction occurred during an interaction session defined as a repetitive interaction session. In some embodiments, the exemplary automatic rules adjustment module 118 may obtain a permission from each user in the plurality of users to monitor a plurality of activities executing within the computing device 102. In certain embodiments, the plurality of activities may refer to incoming transmissions, social media activity, and/or online shopping information. In some embodiments, the exemplary automatic rules adjustment module 118 may continually receive monitoring data of the plurality of activities executed within the plurality of computing devices for a predetermined period of time. In certain embodiments, the predetermined period of time may refer to a duration of time the user agrees to be monitored within the permission. In some embodiments, the exemplary automatic rules adjustment module 118 may identify a plurality of related incoming interaction sessions being initiated within the predetermined period of time. In some embodiments, the exemplary automatic rules adjustment module 118 may automatically verify at least one common session parameter associated with the plurality of related incoming interaction sessions to identify the plurality of related incoming interaction sessions as being a plurality of repetitive interaction sessions. In certain embodiments, the at least one common session parameter may refer to a session interaction protocol certificate associated with at least one of a particular entity, a particular individual, or a particular physical location. In some embodiments, the exemplary automatic rules adjustment module 118 may automatically verify the least one common session parameter associated with the plurality of repetitive interaction sessions based on a database of known session interaction parameters. In some embodiments, the exemplary automatic rules adjustment module 118 may input the at least one common session parameter of the plurality of related incoming interaction sessions into the machine learning module 120 to determine that at least one transaction associated with the computing device 102 associated with the user based on the session interaction protocol. In certain embodiments, the transaction may refer to an online purchase agreement between the user and a computing device associated with the particular entity, a transfer of funds to an external computing device, or a granting of access to sensitive information associated with the user. In some embodiments, the exemplary automatic rules adjustment module 118 may determine a plurality of fraudulent transactional rules associated with the transaction and the computing device based on a pre-generated database of transactional rules. In certain embodiments, the plurality of fraudulent transaction rules may refer to a set of rules needed to execute a digital transaction. For example, the fraudulent transaction rules may refer to a verification of account information, a transfer threshold, a geo-fence trigger, and/or a transaction occurring subsequent to the predetermined period of time. In some embodiments, the exemplary automatic rules adjustment module 118 may automatically adjust the plurality of fraudulent transactional rules associated with the at least one transaction based on the determination that the transaction occurred during at least one repetitive interaction session. In certain embodiments, the automatic adjustment of the plurality of fraudulent transactional rules may refer to increasing and/or decreasing a plurality of factors associated with a multi-factor authentication of the individual. In some embodiments, the exemplary automatic rules adjustment module 118 may utilize a natural language processing module 124 to automatically generate at least one interaction notification for transmission to the computing device 102. In certain embodiments, the interaction notification may refer to an interactive communication generated via a utilization of a respective detection unit 126. For example, the interactive communication may refer to a generated interactive script for a call center agent and/or agent associated with the entity to engage with the computing device 102 associated with the user. In some embodiments, the exemplary automatic rules adjustment module 118 may receive a response to the interactive communication from the computing device 102. In certain embodiments, the response to the interactive communication may refer to a plurality of preferences associated with the user. In some embodiments, the exemplary automatic rules adjustment module 118 may automatically update the database of known session interaction parameters based on the response to the interactive communication. In some embodiments, the exemplary automatic rules adjustment module 118 may display the at least one interaction notification and an adjustment to the plurality of fraudulent transactional rules. In some embodiments, the response to the interaction communication may refer to an input of the machine learning module 120. In some embodiments, the automatic update of the database of known session interaction parameters may refer to an output of the machine learning module 120.

In some embodiments, the present disclosure describes systems for automatically utilizing at least one trained machine learning algorithm of a plurality of machine learning algorithms within the machine learning module 120 that may determine at least one transaction associated with the computing device 102 of the plurality of computing devices associated with the user based on at least one common session parameter of the plurality of related incoming interaction sessions. In some embodiments, the machine learning module 120 may determine a plurality of fraudulent transactional rules associated with the at least one transaction based on a pre-generated database of transactional rules. In some embodiments, the machine learning module 120 may automatically adjust the plurality of fraudulent transactional rules associated with the at least one transaction based on a determination that the at least one transaction occurred during at least one repetitive interaction session of a plurality of repetitive interaction sessions. In some embodiments, the machine learning module 120 may automatically generate at least one interaction notification for transmission to the computing device 102 of the plurality of computing devices. In some embodiments, the machine learning module 120 may utilize the repetitive detection unit 126 to generate an interactive communication in response to the at least one transaction associated with the user occurring during a different predetermined period of time associated with the at least one repetitive interaction session. In some embodiments, the machine learning module 120 may receive a response to the interactive communication. In some embodiments, the machine learning module 120 may automatically update the database of known session interaction parameters based on the response to the interactive communication. In some embodiments, the machine learning module 120 may display the at least one interaction notification and an adjustment to the plurality of fraudulent transactional rules to increase the number of steps required to authenticate a transaction in response to a determination that the user is currently on a call with a suspicious interaction session. In certain embodiments, the machine learning module 120 may refer to the trained machine learning algorithm trained using an unsupervised learning and/or a semi-supervised learning for the predetermined period of time. For example, the machine learning module may include at least one of regression algorithm, instance-based algorithm, regularization algorithm, decision tree algorithm, Bayesian algorithm, clustering algorithm, associated rule learning algorithm, deep learning algorithm, dimensionality reduction algorithm, ensemble algorithm, and/or artificial neural network algorithm.

In some embodiments, the data output module 122 may identify the plurality of related incoming interaction sessions being initiated by the computing device 102 within the predetermined period of time. In some embodiments, the data output module 122 may generate a determination associated the at least one transaction based on the at least one common session parameter of the plurality of related incoming interaction sessions. In some embodiments, the data output module 122 may generate a plurality of fraudulent transactional rules associated with the at least one transaction and the computing device 102 based on the pre-generated database of transactional rules. In some embodiments, the data output module 122 may generate an automatic adjustment to the plurality of fraudulent transactional rules associated with the at least one transaction based on the determination that the at least one transaction occurring during at least one repetitive interaction session. In certain embodiments, the repetitive interaction session may refer to an authenticated and verified interaction session from a known entity that has occurred previously to the current interaction session. For example, the repetitive interaction session may refer to a weekly call between the user and a vendor to place weekly supply orders. In some embodiments, the data output module 122 may automatically generate at least one interaction notification for transmission to the computing device 102. In some embodiments, the data output module 122 may receive a response to the interactive communication from the computing device 102. In some embodiments, the data output module 122 may generate an update to the database of known session interaction parameters based on the response to the interactive communication.

In some embodiments, the illustrative program engine 104 may obtain a permission from each user in the plurality of users to monitor a plurality of activities executed within the computing device 102. In some embodiments, the illustrative program engine 104 may continually receive monitoring data of the plurality of activities executed within the computing device 102 for a predetermined period of time. In some embodiments, the illustrative program engine 104 may identify a plurality of related incoming interaction sessions being initiated by the computing device 102 within the predetermined period of time. In some embodiments, the illustrative program engine 104 may automatically verify at least one common session parameter associated with the plurality of related incoming interactions to identify the plurality related incoming interaction session as being a plurality of repetitive interaction sessions when the at least one common session parameter is associated with at least one of a particular entity, a particular individual, and/or a particular physical location. In some embodiments, the illustrative program engine 104 may utilize the machine learning module 120 to determine at least one transaction associated with the computing device 102 based on the at least one common session parameter. In some embodiments, illustrative program engine 104 may determine a plurality of fraudulent transactional rules associated with the at least one transaction and the computing device 102 associated with the user based on a pre-generated database of transactional rules. In some embodiments, the illustrative program engine 104 may automatically adjust the plurality of the fraudulent rules associated with the at least one transaction based on a determination that the at least one transaction occurred during at least one repetitive interaction session of the plurality of repetitive interaction sessions. In some embodiments, the illustrative program engine 104 may utilize the natural language processing module 124 to automatically generate at least one interaction notification for transmission to the computing device 102 of the plurality of computing devices. In certain embodiments, the illustrative program engine 104 may utilize a repetitive detection unit 126 to generate an interactive communication in response to the at least one transaction associated with the computing device 102 occurring during a different predetermined period of time associated with the at least one repetitive interaction session. In some embodiments, the illustrative program engine 104 may receive a response to the interactive notification from the computing device 102. In some embodiments, the illustrative program engine 104 may automatically update the database of known session interaction parameters based on the response to the interactive notification. In some embodiments, the illustrative program engine 104 may utilize a graphical user interface to display the at least one interaction notification and an adjustment the plurality of fraudulent transactional rules to increase the number of steps required to authenticate a transaction in response to a determination that the user is currently on a call with a suspicious interaction session.

In some embodiments, the non-transient memory 110 may store the obtained permission from each user in the plurality of users associated with the monitoring of the plurality of activities executed within the computing device 102. In some embodiments, the non-transient memory 110 may store the monitoring data associated with the plurality of activities executed within the predetermined period of time. In some embodiments, the non-transient memory 110 may store an identification of the plurality of related incoming interaction sessions being initiated during the predetermined period of time. In some embodiments, the non-transient memory 110 may store the determination that the transaction associated with the computing device 102 based on the at least one common session interaction parameter. In some embodiments, the non-transient memory 110 may store the determined plurality of fraudulent transactional rules associated with the at least one transaction and the computing device 102 based on the pre-generated database of transactional rules. In some embodiments, the non-transient memory 110 may store the automatic adjustment to the plurality of fraudulent transactional rules during at least one repetitive interaction session. In some embodiments, the non-transient memory 110 may store the at least one interaction notification for transmission to the computing device 102. In some embodiments, the non-transient memory 110 may store the response to the interactive notification. In some embodiments, the non-transient memory 110 may store an automatic update to the database of known session interaction parameters.

Figure 2:
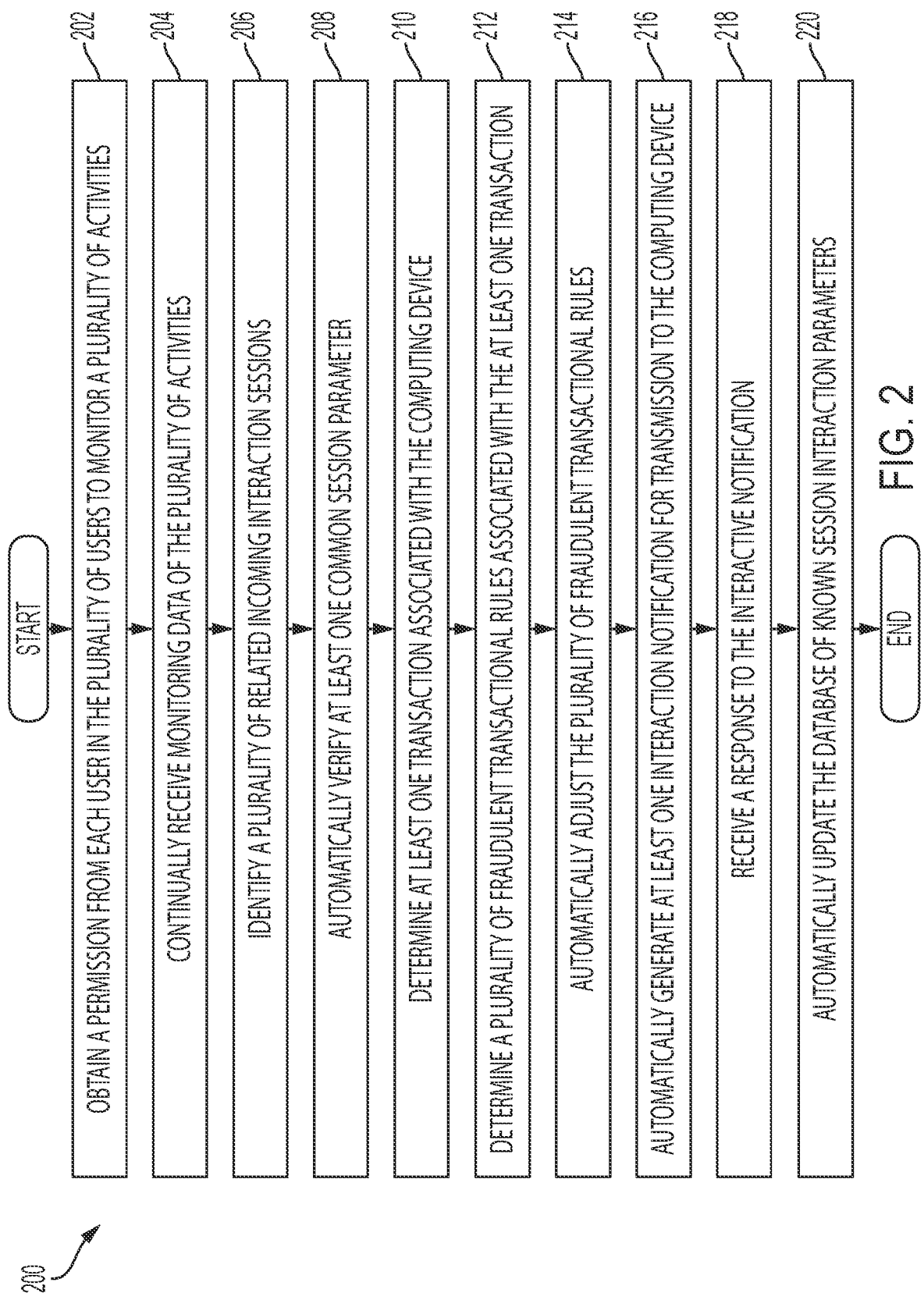
FIG. 2 is a flowchart illustrating operational steps of automatically adjusting a plurality of fraudulent transaction rules associated with at least one transaction, in accordance with one or more embodiments of the present disclosure.

FIG. 2 is a flowchart 200 illustrating operational steps for automatically adjusting a plurality of fraudulent transaction rules associated with at least one transaction, in accordance with one or more embodiments of the present disclosure.

In step 202, the illustrative program engine 104 within the computing device 102 may be programmed to obtain a permission from each user in the plurality of users to monitor a plurality of activities. In some embodiments, the illustrative program engine 104 may obtain the permission from each user in the plurality of users to monitor a plurality of activities executed by the computing device 102 associated with the user. In certain embodiments, the plurality of activities may refer to calling-related activities, online activities, and/or transactional activities associated with the computing device 102. In certain embodiments, the computing device 102 may refer to a smart phone, smart tablet, laptop, or any computing device capable of performing the plurality of activities. In some embodiments, the exemplary automatic rules adjustment module 118 may obtain the permission from each user in the plurality of users to monitor the plurality of activities executed by the computing device 102 associated with the user.

In step 204, the illustrative program engine 104 may continually receive monitoring data of the plurality of activities. In some embodiments, the illustrative program engine 104 may continually receive the monitoring data of the plurality of activities executed within the computing device 102 for a predetermined period of time. In some embodiments, the illustrative program engine 104 may continually receive the monitoring data of the plurality of activities executed within the computing device 102 for the predetermined period of time in response to obtaining the permission from the plurality of users. In certain embodiments, the monitoring data may refer to data detailing information transmitted during the plurality of activities. In certain embodiments, the predetermined period of time may refer to a duration of time that the user permits the illustrative program engine 104 to monitor associated with the permission and prior to automatically halting the monitoring of the computing device 102 at the expiration of the predetermined period of time. In some embodiments, the exemplary automatic rules adjustment module 118 may continually receive the monitoring data of the plurality of activities executed within the computing device 102 for the predetermined period of time in response to obtaining the permission from the plurality of users.

In step 206, the illustrative program engine 104 may identify a plurality of related incoming interaction sessions. In some embodiments, the illustrative program engine 104 may identify the plurality of related incoming interaction sessions being initiated by the computing device 102. In some embodiments, the illustrative program engine 104 may identify the plurality of related incoming interaction sessions being initiated by the computing device 102 within the predetermined period of time. In certain embodiments, each related incoming interaction session may refer to an incoming phone call associated with a previously received phone call. In some embodiments, the exemplary automatic rules adjustment module 118 may identify the plurality of related incoming interaction sessions being initiated by the computing device 102 within the predetermined period of time.

In step 208, the illustrative program engine 104 may automatically verify at least one common session parameter. In some embodiments, the illustrative program engine 104 may automatically verify the at least one common session parameter associated with the plurality of related incoming interaction sessions to identify the plurality of related incoming interaction sessions as being a plurality of repetitive interaction sessions. In some embodiments, the illustrative program engine 104 may identify the plurality of related incoming interaction sessions as being the plurality of repetitive interaction sessions when the at least one common session parameter is associated with at least one of a particular entity, a particular individual, or a particular physical location. In certain embodiments, the identification that the plurality of related incoming interaction sessions is the plurality of repetitive interaction sessions may be based on the database of known session interaction parameters. In some embodiments, the exemplary automatic rules adjustment module 118 may automatically verify the at least one common session parameter associated with the plurality of related incoming interaction sessions to identify the plurality of related incoming interaction sessions as being a plurality of repetitive interaction sessions when the at least one common session parameter is associated with at least one of a particular entity, a particular individual, or a particular physical location. In certain embodiments, the at least one common session parameter associated with the plurality of related incoming interaction sessions may refer to at least one session interaction protocol certificate associated with at least one computing device.

In step 210, the illustrative program engine 104 may determine at least one transaction associated with the computing device 102. In some embodiments, the illustrative program engine 104 may input the at least one common session parameter of the plurality of related incoming interaction sessions into the machine learning module 120 to determine the at least one transaction associated with the computing device 102. In some embodiments, the illustrative program engine 104 may input the at least one common session parameter of the plurality of repetitive incoming interaction sessions into the machine learning module 120 to determine the at least one transaction associated with the computing device 102. In certain embodiments, the at least one transaction may refer to an engagement between the user and an entity to exchange funds for a service or good. For example, the transaction may refer to a user purchasing a food order over the phone. In some embodiments, the exemplary automatic rules adjustment module 118 may determine the at least one transaction associated with the computing device 102 based on the at least one common session parameter of the plurality of related incoming interaction sessions.

In step 212, the illustrative program engine 104 may determine a plurality of fraudulent transactional rules associated with the at least one transaction. In some embodiments, the illustrative program engine 104 may determine the plurality of fraudulent transactional rules associated with the at least one transaction and the computing device 102 associated with the user. In some embodiments, the illustrative program engine 104 may determine the plurality of fraudulent transactional rules associated with the at least one transaction and the computing device 102 associated with the user based on a pre-generated database of transactional rules. In certain embodiments, the plurality of fraudulent transactional rules may refer to a number of rules required to execute a transaction during the predetermined period of time, where if any of the rules fail then the transaction is halted until the user provides additional information via the computing device 102. In certain embodiments, the pre-generated database of transactional rules may refer to a plurality of transactional rules associated with an external computing device for an entity. In some embodiments, the exemplary automatic rules adjustment module 118 may determine the plurality of fraudulent transactional rules associated with the at least one transaction and the computing device 102 associated with the user based on the pre-generated database of transactional rules.

In step 214, the illustrative program engine 104 may automatically adjust the plurality of fraudulent transactional rules. In some embodiments, the illustrative program engine 104 may automatically adjust the plurality of fraudulent transactional rules associated with the at least one transaction. In some embodiments, the illustrative program engine 104 may automatically adjust the plurality of fraudulent transactional rules associated with the at least one transaction based on a determination that the at least one transaction occurred during at least one repetitive interaction session of the plurality of repetitive interaction sessions. In certain embodiments, the automatic adjustment may refer to a change and/or a removal of at least one rule of the plurality of fraudulent transactional rules based on the additional information from the user associated with a failed rule. In certain embodiments, the automatic adjustment of the plurality of fraudulent transactional rules may refer to increasing and/or decreasing a plurality of factors associated with a multi-factor authentication of the user. In some embodiments, the exemplary automatic rules adjustment module 118 may automatically adjust the plurality of fraudulent transactional rules associated with the at least one transaction based on the determination that the at least one transaction occurred during the at least one repetitive interaction session of the plurality of repetitive interaction sessions.

In step 216, the illustrative program engine 104 may automatically generate at least one interaction notification for transmission to the computing device 102. In some embodiments, the illustrative program engine 104 may utilize the natural language processing module 124 to automatically generate at least one interaction notification for transmission to the particular computing device 102 of the plurality of computing devices. In certain embodiments, the interaction notification may refer to a detailed communication script associated with the repetitive interaction session that can be displayed on the computing device 102 of the plurality of computing devices. In some embodiments, the illustrative program engine 104 may utilize a repetitive detection unit 126 to generate an interactive communication in response to the at least one transaction associated with the at least one user of the plurality of users occurring during a predetermined period of time associated with the at least one repetitive interaction session of the plurality of the repetitive interaction sessions. In some embodiments, the exemplary automatic rules adjustment module 118 may utilize the natural language processing module 124 to automatically generate at least one interaction notification for transmission to the particular computing device 102 of the plurality of computing devices.

In step 218, the illustrative program engine 104 may receive a response to the interactive notification. In some embodiments, the illustrative program engine 104 may receive the response to the interactive notification from the computing device 102. In some embodiments, the illustrative program engine 104 may utilize a plurality of sensors to detect a signal associated with a plurality of preferences associated with the user to generate the response to the interaction notification. In certain embodiments, the response to the interactive notification may refer to the plurality of user preferences that may be utilized to subsequently adjust the plurality of fraudulent transactional rules. In some embodiments, the exemplary automatic rules adjustment module 118 may receive the response to the interactive notification from the computing device 102.

In step 220, the illustrative program engine 104 may automatically update the database of known session interaction parameters. In some embodiments, the illustrative program engine 104 may automatically update the database of known session interaction parameters based on the response to the interactive notification. In certain embodiments, the automatic update may refer to the removal of at least two rules of the plurality of fraudulent transactional rules that alter the database of known session interaction parameters. In other embodiments, the automatic update may refer to the addition of at least two rules of the plurality of fraudulent transactional rules that alter the database of known session interaction parameters. In some embodiments, the exemplary automatic rules adjustment module 118 may automatically update the database of known session interaction parameters based on the response to the interactive notification.

In some embodiments, the illustrative program engine 104 may display the at least one interaction notification and an adjustment to the plurality of fraudulent transactional rules. In some embodiments, the illustrative program engine 104 may utilize a graphical user interface to display the at least one interaction notification and an adjustment the plurality of fraudulent transactional rules to increase the number of steps required to authenticate a transaction in response to a determination that the user is currently on a call with a suspicious interaction session. In some embodiments, the exemplary automatic rules adjustment module 118 may utilize the graphical user interface to display the at least one interaction notification and an adjustment the plurality of fraudulent transactional rules to increase the number of steps required to authenticate a transaction in response to a determination that the user is currently on a call with a suspicious interaction session.

FIG. 3 depicts an exemplary interactive communication 300 generated by a utilization of a repetitive detection unit of a computing device, in accordance with one or more embodiments of the present disclosure.

In some embodiments, the exemplary interactive communication 300 may include a generated script to be followed by at least one speaker of an entity (e.g., a representative of a financial institution). In certain embodiments, a first speaker 302 (e.g., a customer) may initiate an interaction session between the computing device 102 associated with the first speaker 302 and an external computing device associated with an entity. In some embodiments, the first speaker 302 may execute at least one transaction using the computing device 102 by providing information to identify his or her identity and the nature of the transaction. For example, the first speaker 302 may provide account information and a confirmation number associated with the transaction to automatically adjust the plurality of fraudulent transactional rules. In certain embodiments, a second speaker 304 may have a plurality of specific lines of dialogue directed at confirming the identity of the first speaker 302, ensuring the nature of the at least one transaction, and authenticating the transaction to automatically adjust the plurality of the fraudulent transactional rules. In some embodiments, the exemplary automatic rules adjustment module 118 may generate the second speaker' 304 script of the exemplary interactive communication 300 based on the utilization of the repetitive detection unit 126 of the computing device 102 in response to the transaction occurring between the first speaker 302 and the second speaker 304 during the predetermined period of time. In some embodiments, the exemplary automatic rules adjustment module 118 may generate the exemplary interactive communication 300 based on the at least one repetitive interaction session of the plurality of the repetitive interaction sessions.

Figure 4:
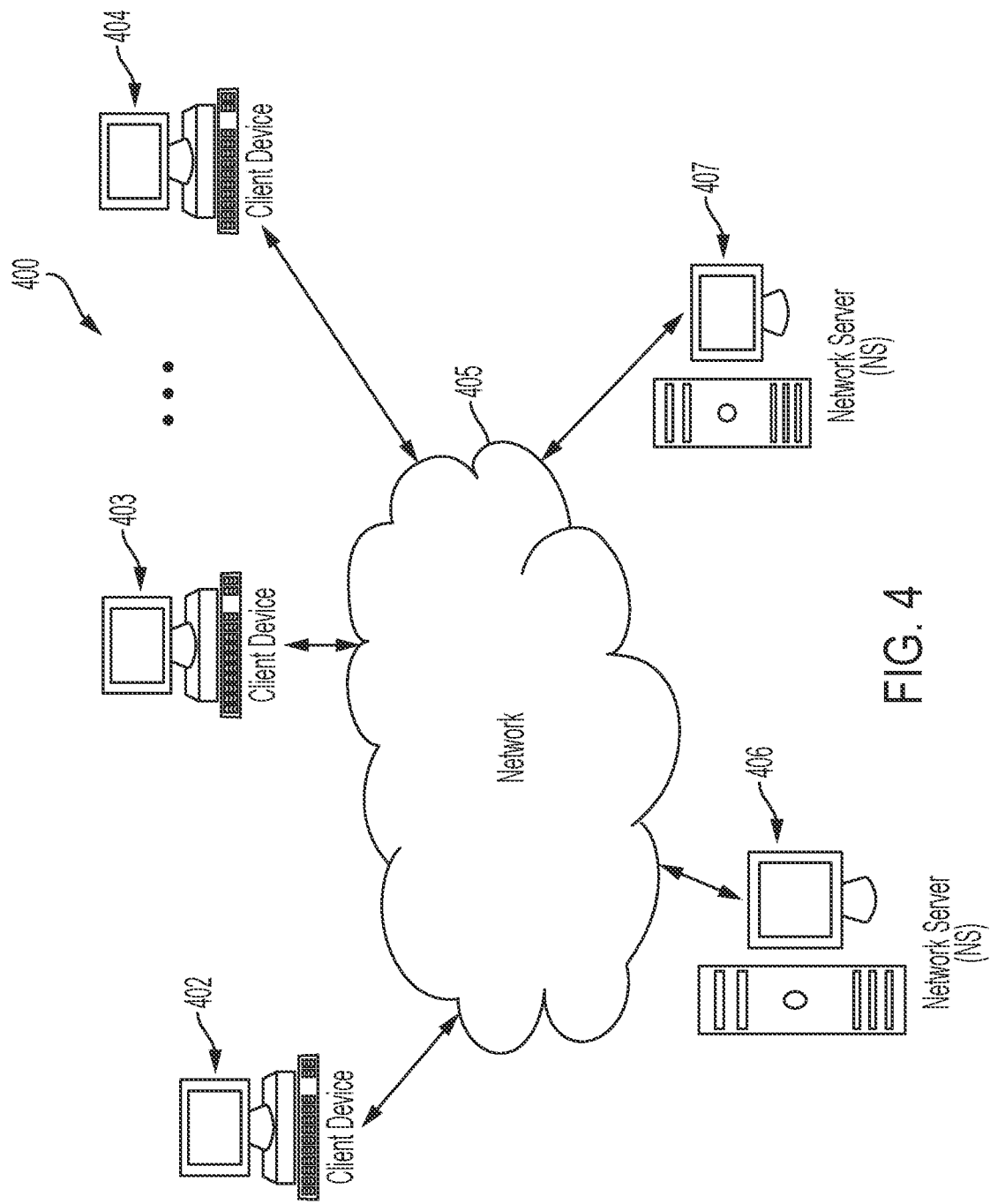
FIG. 4 depicts a block diagram of an exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured dynamically determine, in an augmented reality, an identity of at least one user of a plurality of users based on a multi-factor authentication and generate a unique-universal identifier associated with the security module and the authenticated digital token to automatically authenticate a plurality of activities, as detailed herein. In some embodiments, the exemplary computer-based system/platform 400 may be based on a scalable computer and/or network architecture that incorporates various strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to manage the exemplary automatic rules adjustment module 118 of the present disclosure, automatically utilizing at least one machine-learning model described herein.

In some embodiments, referring to FIG. 4, members 402-404 (e.g., clients) of the exemplary computer-based system/platform 400 may include virtually any computing device capable of automatically updating a database of known session interaction parameters, dynamically adjusting a plurality of fraudulent transactional rule, and automatically executing an authenticated transaction via a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may launch one or more applications, such as Internet browsers, mobile applications, voice calls, video games, videoconferencing, and email, among others. In some embodiments, one or more member devices within member devices 402-404 may be configured to receive and to send web pages, and the like. In some embodiments, exemplary automatic rules adjustment module 118 of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to determine at least one transaction associated with the computing device 102; automatically adjust a plurality of fraudulent transactional rules; and automatically generate at least one interaction notification.

Figure 5:
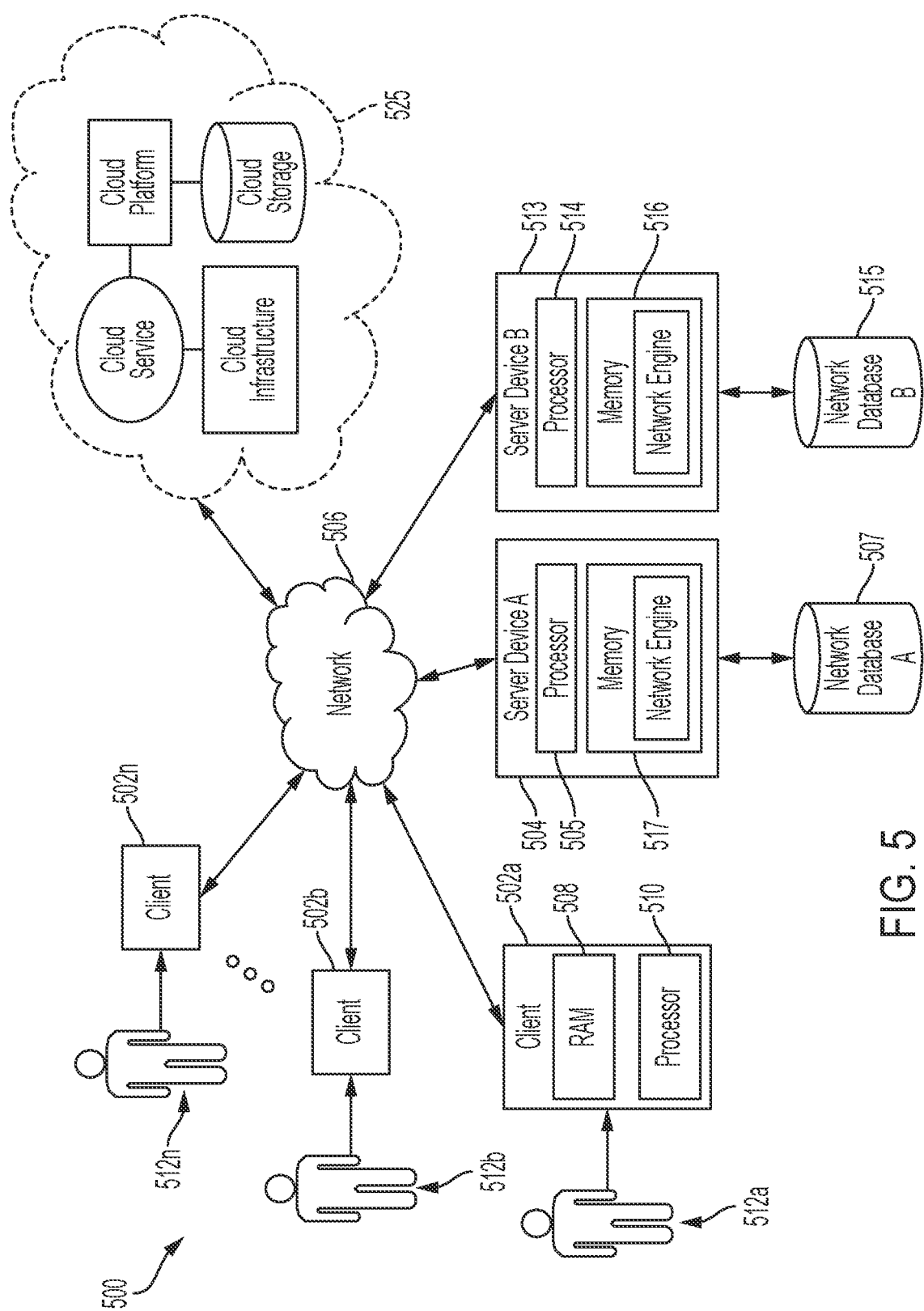
FIG. 5 depicts a block diagram of another exemplary computer-based system/platform in accordance with one or more embodiments of the present disclosure.

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™, Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502a through 502n may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
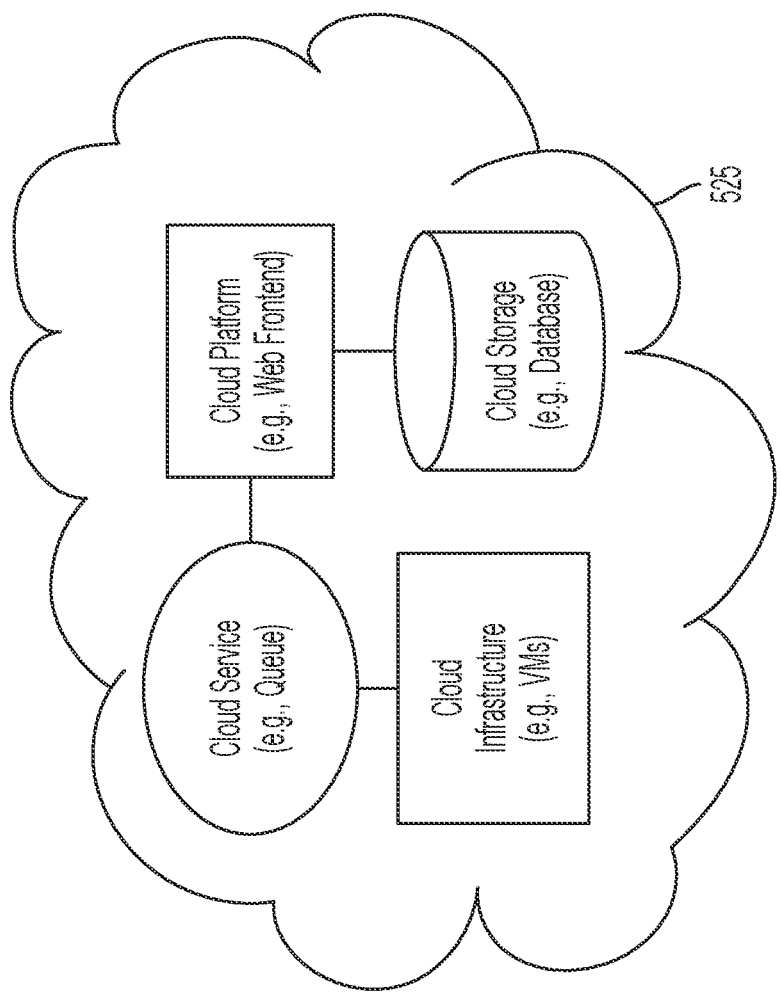
FIGS. 6 and 7 are diagrams illustrating implementations of cloud computing architecture/aspects with respect to which the disclosed technology may be specifically configured to operate, in accordance with one or more embodiments of the present disclosure.
Figure 7:
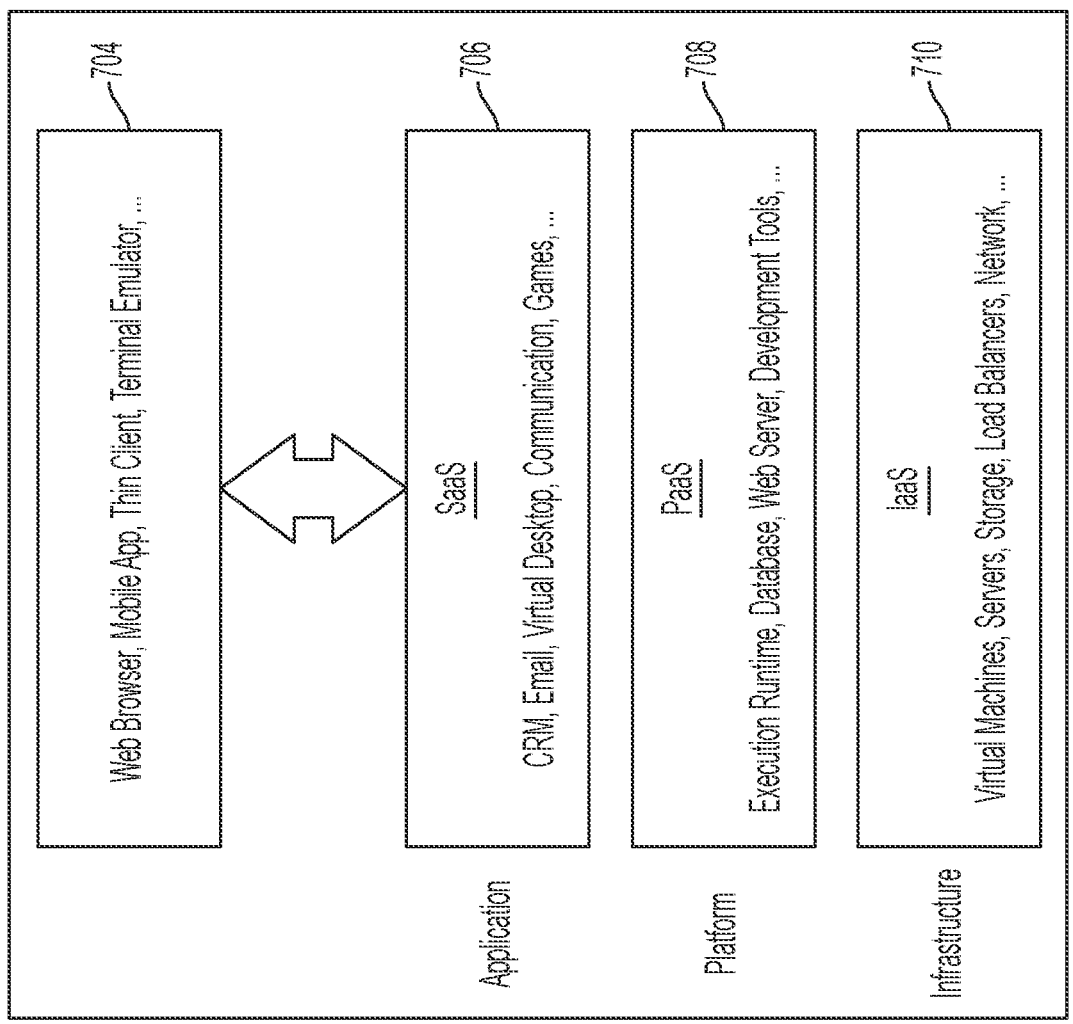

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7. illustrates the exemplary inventive computer-based components of the present disclosure may be specifically configured to operate in the cloud computing/architecture 525 as a source database 704, where the source database 704 may be a web browser. a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS) 710, platform as a service (PaaS) 708, and/or software as a service (SaaS) 706.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile;™ (20) Microsoft DirectX™; (21).NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary ASR system of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary ASR system of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

The aforementioned examples are, of course, illustrative and not restrictive.

At least some aspects of the present disclosure will now be described with reference to the following numbered clauses.

Clause 1. A method may include: obtaining, by at least one processor, via each respective instance of at least one graphical user interface (GUI) having at least one programmable GUI element, a permission from each user in a plurality of users to monitor a plurality of activities executed within of a plurality of computing devices associated with the plurality of users; continually receiving, by the at least one processor, in response to obtaining the permission from the plurality of users, monitoring data of the plurality of activities executed within the plurality of computing devices for a predetermined period of time; identifying, by the at least one processor, based on the monitoring data, a plurality of related incoming interaction sessions being initiated, within the predetermined period of time, across the plurality of computing devices associated with the plurality of users; automatically verifying, by the at least one processor of the plurality of computing devices, at least one common session parameter associated with the plurality of related incoming interaction sessions to identify the plurality of related incoming interaction sessions as being a plurality of repetitive interaction sessions when, based on a database of known session interaction parameters, the at least one common session parameter is associated with at least one of a particular entity, a particular individual, or a particular physical location; inputting, by the at least one processor of the plurality of computing devices, the at least one common session parameter of the plurality of related incoming interaction sessions into a machine learning algorithm to determine at least one transaction associated with at least one computing device of the plurality of computing devices associated with the plurality of users; determining, by the at least one processor, a plurality of fraudulent transactional rules associated with the at least one transaction and the at least one computing device of the plurality of the computing devices associated with the plurality of users based on a pre-generated database of transactional rules; automatically adjusting, by the at least one processor, the plurality of fraudulent transactional rules associated with the at least one transaction based on a determination that the at least one transaction occurred during at least one repetitive interaction session of the plurality of the repetitive interaction sessions; utilizing, by the at least one processor, a natural language processing algorithm to automatically generate at least one interaction notification for transmission to the particular computing device of the plurality of computing devices; receiving, by the at least one processor, from the particular computing device, a response to the interactive notification; and automatically updating, by the at least one processor, the database of known session interaction parameters based on the response to the interactive notification.

Clause 2. The method according to clause 1, where the plurality of activities includes a plurality of calling-related activities associated with the plurality of computing devices of the plurality of users.

Clause 3. The method according to clause 1 or 2, where the at least one common session parameter associated with the plurality of related incoming interaction sessions include at least one session interaction protocol certificate associated with at least one computing device.

Clause 4. The method according to clause 1, 2 or 3, where the plurality of fraudulent transactional rules includes a number of steps to authenticate the at least one transaction associated with each user of the plurality of users.

Clause 5. The method according to clause 1, 2, 3 or 4, where the at least one interaction notification is configured to utilize a repetitive detection unit of the particular computing device to generate an interactive communication in response to the at least one transaction associated with the at least one user of the plurality of users occurring during a predetermined period of time associated with the at least one repetitive interaction session of the plurality of the repetitive interaction sessions.

Clause 6. The method according to clause 1, 2, 3, 4 or 5, where the automatically generated interaction notification includes a detailed communication script associated with the repetitive interaction session.

Clause 7. The method according to clause 1, 2, 3, 4, 5 or 6, where the response to the interaction notification includes detecting a signal associated with a plurality of preferences associated with the user.

Clause 8. The method according to clause 1, 2, 3, 4, 5, 6 or 7, further including utilizing a graphical user interface to display the at least one interaction notification and an adjustment the plurality of fraudulent transactional rules to increase a number of steps required to authenticate a transaction in response to a determination that the user is currently on a call with a suspicious interaction session.

Clause 9. A method may include: receiving, by the at least one processor, monitoring data of a plurality of activities executed within a plurality of computing devices for a predetermined period of time; identifying, by the at least one processor, based on the monitoring data, a plurality of related incoming interaction sessions being initiated, within the predetermined period of time, across the plurality of computing devices associated with the plurality of users; automatically verifying, by the at least one processor of the plurality of computing devices, at least one common session parameter associated with the plurality of related incoming interaction sessions to identify the plurality of related incoming interaction sessions as being a plurality of repetitive interaction sessions when, based on a database of known session interaction parameters, the at least one common session parameter is associated with at least one of a particular entity, a particular individual, or a particular physical location; inputting, by the at least one processor of the plurality of computing devices, the at least one common session parameter of the plurality of related incoming interaction sessions into a machine learning algorithm to determine at least one transaction associated with at least one computing device of the plurality of computing devices associated with the plurality of users; determining, by the at least one processor, a plurality of fraudulent transactional rules associated with the at least one transaction and the at least one computing device of the plurality of the computing devices associated with the plurality of users based on a pre-generated database of transactional rules; automatically adjusting, by the at least one processor, the plurality of fraudulent transactional rules associated with the at least one transaction based on a determination that the at least one transaction occurred during at least one repetitive interaction session of the plurality of the repetitive interaction sessions; utilizing, by the at least one processor, a natural language processing algorithm to automatically generate at least one interaction notification for transmission to the particular computing device of the plurality of computing devices; receiving, by the at least one processor, from the particular computing device, a response to the interactive notification; utilizing a graphical user interface to display the at least one interaction notification or adjusting the plurality of fraudulent transactional rules to increase a number of steps required to authenticate a transaction in response to a determination that the user is currently on a call with a suspicious interaction session; and automatically updating, by the at least one processor, the database of known session interaction parameters based on the response to the interactive notification.

Clause 10. The method according to clause 9, where the plurality of activities includes a plurality of calling-related activities associated with the plurality of computing devices of the plurality of users.

Clause 11. The method according to clause 9 or 10, where the at least one common session parameter associated with the plurality of related incoming interaction sessions include at least one session interaction protocol certificate associated with at least one computing device.

Clause 12. The method according to clause 9, 10, or 11, where the plurality of fraudulent transactional rules includes a number of steps to authenticate the at least one transaction associated with each user of the plurality of users.

Clause 13. The method according to clause 9, 10, 11, or 12, where the at least one interaction notification is configured to utilize a repetitive detection unit of the particular computing device to generate an interactive communication in response to the at least one transaction associated with the at least one user of the plurality of users occurring during a predetermined period of time associated with the at least one repetitive interaction session of the plurality of the repetitive interaction sessions.

Clause 14. The method according to clause 9, 10, 11, 12 or 13, where the automatically generated interaction notification includes a detailed communication script associated with the repetitive interaction session.

Clause 15. The method according to clause 9, 10, 11, 12, 13 or 14, where the response to the interaction notification includes detecting a signal associated with a plurality of preferences associated with the user.

Clause 16. A system may include: non-transient computer memory, storing software instructions; and at least one processor of a first computing device associated with a user; where, when the at least one processor executes the software instructions, the first computing device is programmed to: obtain, by at least one processor, via each respective instance of at least one graphical user interface (GUI) having at least one programmable GUI element, a permission from each user in a plurality of users to monitor a plurality of activities executed within of a plurality of computing devices associated with the plurality of users; continually receive, by the at least one processor, in response to obtaining the permission from the plurality of users, monitoring data of the plurality of activities executed within the plurality of computing devices for a predetermined period of time; identify, by the at least one processor, based on the monitoring data, a plurality of related incoming interaction sessions being initiated, within the predetermined period of time, across the plurality of computing devices associated with the plurality of users; automatically verify, by the at least one processor of the plurality of computing devices, at least one common session parameter associated with the plurality of related incoming interaction sessions to identify the plurality of related incoming interaction sessions as being a plurality of repetitive interaction sessions when, based on a database of known session interaction parameters, the at least one common session parameter is associated with at least one of a particular entity, a particular individual, or a particular physical location; input, by the at least one processor of the plurality of computing devices, the at least one common session parameter of the plurality of related incoming interaction sessions into a machine learning algorithm to determine at least one transaction associated with at least one computing device of the plurality of computing devices associated with the plurality of users; determine, by the at least one processor, a plurality of fraudulent transactional rules associated with the at least one transaction and the at least one computing device of the plurality of the computing devices associated with the plurality of users based on a pre-generated database of transactional rules; automatically adjust, by the at least one processor, the plurality of fraudulent transactional rules associated with the at least one transaction based on a determination that the at least one transaction occurred during at least one repetitive interaction session of the plurality of the repetitive interaction sessions; utilize, by the at least one processor, a natural language processing algorithm to automatically generate at least one interaction notification for transmission to the particular computing device of the plurality of computing devices; receive, by the at least one processor, from the particular computing device, a response to the interactive notification; and automatically update, by the at least one processor, the database of known session interaction parameters based on the response to the interactive notification.

Clause 17. The system according to clause 16, where the at least one common session parameter associated with the plurality of related incoming interaction sessions include at least one session interaction protocol certificate associated with at least one computing device.

Clause 18. The system according to clause 16 or 17, where the plurality of fraudulent transactional rules includes a number of steps to authenticate the at least one transaction associated with each user of the plurality of users.

Clause 19. The system according to clause 16, 17, or 18, where the at least one interaction notification is configured to utilize a repetitive detection unit of the particular computing device to generate an interactive communication in response to the at least one transaction associated with the at least one user of the plurality of users occurring during a predetermined period of time associated with the at least one repetitive interaction session of the plurality of the repetitive interaction sessions.

Clause 20. The system according to clause 16, 17, 18 or 19, where the response to the interaction notification comprises detecting a signal associated with a plurality of preferences associated with the user.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A computer-implemented method comprising:
obtaining, by at least one processor, via each respective instance of at least one graphical user interface (GUI) having at least one programmable GUI element, a permission from each user in a plurality of users to monitor a plurality of activities executed within of a plurality of computing devices associated with the plurality of users;

continually receiving, by the at least one processor, in response to obtaining the permission from the plurality of users, monitoring data of the plurality of activities executed within the plurality of computing devices for a predetermined period of time;

identifying, by the at least one processor, based on the monitoring data, a plurality of related incoming interaction sessions being initiated, within the predetermined period of time, across the plurality of computing devices associated with the plurality of users;

automatically verifying, by the at least one processor of the plurality of computing devices, at least one common session parameter associated with the plurality of related incoming interaction sessions to identify the plurality of related incoming interaction sessions as being a plurality of repetitive interaction sessions when, based on a database of known session interaction parameters, the at least one common session parameter is associated with at least one of a particular entity, a particular individual, or a particular physical location;

inputting, by the at least one processor of the plurality of computing devices, the at least one common session parameter of the plurality of related incoming interaction sessions into a machine learning algorithm to determine at least one transaction associated with at least one computing device of the plurality of computing devices associated with the plurality of users;

determining, by the at least one processor, a plurality of fraudulent transactional rules associated with the at least one transaction and the at least one computing device of the plurality of the computing devices associated with the plurality of users based on a pre-generated database of transactional rules;

automatically adjusting, by the at least one processor, the plurality of fraudulent transactional rules associated with the at least one transaction based on a determination that the at least one transaction occurred during at least one repetitive interaction session of the plurality of the repetitive interaction sessions;

utilizing, by the at least one processor, a natural language processing algorithm to automatically generate at least one interaction notification for transmission to the particular computing device of the plurality of computing devices;

receiving, by the at least one processor, from the particular computing device, a response to the interactive notification; and automatically updating, by the at least one processor, the database of known session interaction parameters based on the response to the interactive notification.

2. The computer-implemented method of claim 1, wherein the plurality of activities comprises a plurality of calling-related activities associated with the plurality of computing devices of the plurality of users.

3. The computer-implemented method of claim 1, wherein the at least one common session parameter associated with the plurality of related incoming interaction sessions comprise at least one session interaction protocol certificate associated with at least one computing device.

4. The computer-implemented method of claim 1, wherein the plurality of fraudulent transactional rules comprises a number of steps to authenticate the at least one transaction associated with each user of the plurality of users.

5. The computer-implemented method of claim 1, wherein the at least one interaction notification is configured to utilize a repetitive detection unit of the particular computing device to generate an interactive communication in response to the at least one transaction associated with the at least one user of the plurality of users occurring during a predetermined period of time associated with the at least one repetitive interaction session of the plurality of the repetitive interaction sessions.

6. The computer-implemented method of claim 1, wherein the automatically generated interaction notification comprises a detailed communication script associated with the repetitive interaction session.

7. The computer-implemented method of claim 1, wherein the response to the interaction notification comprises detecting a signal associated with a plurality of preferences associated with the user.

8. The computer-implemented method of claim 1, further comprising utilizing a graphical user interface to display the at least one interaction notification and an adjustment the plurality of fraudulent transactional rules to increase a number of steps required to authenticate a transaction in response to a determination that the user is currently on a call with a suspicious interaction session.

9. A computer-implemented method comprising:

receiving, by at least one processor, monitoring data of a plurality of activities executed within a plurality of computing devices for a predetermined period of time;

identifying, by the at least one processor, based on the monitoring data, a plurality of related incoming interaction sessions being initiated, within the predetermined period of time, across the plurality of computing devices associated with a plurality of users;

automatically verifying, by the at least one processor of the plurality of computing devices, at least one common session parameter associated with the plurality of related incoming interaction sessions to identify the plurality of related incoming interaction sessions as being a plurality of repetitive interaction sessions when, based on a database of known session interaction parameters, the at least one common session parameter is associated with at least one of a particular entity, a particular individual, or a particular physical location;

inputting, by the at least one processor of the plurality of computing devices, the at least one common session parameter of the plurality of related incoming interaction sessions into a machine learning algorithm to determine at least one transaction associated with at least one computing device of the plurality of computing devices associated with the plurality of users;

determining, by the at least one processor, a plurality of fraudulent transactional rules associated with the at least one transaction and the at least one computing device of the plurality of the computing devices associated with the plurality of users based on a pre-generated database of transactional rules;

automatically adjusting, by the at least one processor, the plurality of fraudulent transactional rules associated with the at least one transaction based on a determination that the at least one transaction occurred during at least one repetitive interaction session of the plurality of the repetitive interaction sessions;

utilizing, by the at least one processor, a natural language processing algorithm to automatically generate at least one interaction notification for transmission to the particular computing device of the plurality of computing devices;

receiving, by the at least one processor, from the particular computing device, a response to the interactive notification;

utilizing a graphical user interface to display the at least one interaction notification or adjusting the plurality of fraudulent transactional rules to increase a number of steps required to authenticate a transaction in response to a determination that the user is currently on a call with a suspicious interaction session; and automatically updating, by the at least one processor, the database of known session interaction parameters based on the response to the interactive notification.

10. The computer-implemented method of claim 9, wherein the plurality of activities comprises a plurality of calling-related activities associated with the plurality of computing devices of the plurality of users.

11. The computer-implemented method of claim 9, wherein the at least one common session parameter associated with the plurality of related incoming interaction sessions comprise at least one session interaction protocol certificate associated with at least one computing device.

12. The computer-implemented method of claim 9, wherein the plurality of fraudulent transactional rules comprises a number of steps to authenticate the at least one transaction associated with each user of the plurality of users.

13. The computer-implemented method of claim 9, wherein the at least one interaction notification is configured to utilize a repetitive detection unit of the particular computing device to generate an interactive communication in response to the at least one transaction associated with the at least one user of the plurality of users occurring during a predetermined period of time associated with the at least one repetitive interaction session of the plurality of the repetitive interaction sessions.

14. The computer-implemented method of claim 9, wherein the automatically generated interaction notification comprises a detailed communication script associated with the repetitive interaction session.

15. The computer-implemented method of claim 9, wherein the response to the interaction notification comprises detecting a signal associated with a plurality of preferences associated with the user.

16. A system comprising:
a non-transient computer memory, storing software instructions; and
at least one processor of a first computing device associated with a user;
wherein, when the at least one processor executes the software instructions, the first computing device is programmed to:
obtain, by at least one processor, via each respective instance of at least one graphical user interface (GUI) having at least one programmable GUI element, a permission from each user in a plurality of users to monitor a plurality of activities executed within of a plurality of computing devices associated with the plurality of users;
continually receive, by the at least one processor, in response to obtaining the permission from the plurality of users, monitoring data of the plurality of activities executed within the plurality of computing devices for a predetermined period of time;
identify, by the at least one processor, based on the monitoring data, a plurality of related incoming interaction sessions being initiated, within the predetermined period of time, across the plurality of computing devices associated with the plurality of users;
automatically verify, by the at least one processor of the plurality of computing devices, at least one common session parameter associated with the plurality of related incoming interaction sessions to identify the plurality of related incoming interaction sessions as being a plurality of repetitive interaction sessions when, based on a database of known session interaction parameters, the at least one common session parameter is associated with at least one of a particular entity, a particular individual, or a particular physical location;
input, by the at least one processor of the plurality of computing devices, the at least one common session parameter of the plurality of related incoming interaction sessions into a machine learning algorithm to determine at least one transaction associated with at least one computing device of the plurality of computing devices associated with the plurality of users;
determine, by the at least one processor, a plurality of fraudulent transactional rules associated with the at least one transaction and the at least one computing device of the plurality of the computing devices associated with the plurality of users based on a pre-generated database of transactional rules;
automatically adjust, by the at least one processor, the plurality of fraudulent transactional rules associated with the at least one transaction based on a determination that the at least one transaction occurred during at least one repetitive interaction session of the plurality of the repetitive interaction sessions;
utilize, by the at least one processor, a natural language processing algorithm to automatically generate at least one interaction notification for transmission to the particular computing device of the plurality of computing devices;
receive, by the at least one processor, from the particular computing device, a response to the interactive notification; and
automatically update, by the at least one processor, the database of known session interaction parameters based on the response to the interactive notification.

17. The system of claim 16, wherein the at least one common session parameter associated with the plurality of related incoming interaction sessions comprise at least one session interaction protocol certificate associated with at least one computing device.

18. The system of claim 16, wherein the plurality of fraudulent transactional rules comprises a number of steps to authenticate the at least one transaction associated with each user of the plurality of users.

19. The system of claim 16, wherein the at least one interaction notification is configured to utilize a repetitive detection unit of the particular computing device to generate an interactive communication in response to the at least one transaction associated with the at least one user of the plurality of users occurring during a predetermined period of time associated with the at least one repetitive interaction session of the plurality of the repetitive interaction sessions.

20. The system of claim 16, wherein the response to the interaction notification comprises detecting a signal associated with a plurality of preferences associated with the user.

\* \* \* \* \*